US008432794B2

(12) United States Patent
Terry et al.

(10) Patent No.: US 8,432,794 B2
(45) Date of Patent: Apr. 30, 2013

(54) METHOD AND APPARATUS FOR SELECTING MULTIPLE TRANSPORT FORMATS AND TRANSMITTING MULTIPLE TRANSPORT BLOCKS SIMULTANEOUSLY WITH MULTIPLE H-ARQ PROCESSES

(75) Inventors: Stephen E. Terry, Northport, NY (US); Jin Wang, Central Islip, NY (US); Arty Chandra, Manhasset Hills, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1462 days.

(21) Appl. No.: 11/614,153

(22) Filed: Dec. 21, 2006

(65) Prior Publication Data

US 2007/0153672 A1    Jul. 5, 2007

Related U.S. Application Data

(60) Provisional application No. 60/754,714, filed on Dec. 29, 2005, provisional application No. 60/839,845, filed on Aug. 24, 2006.

(51) Int. Cl.
*H04J 1/16* (2006.01)
*H04J 3/14* (2006.01)

(52) U.S. Cl.
USPC ........... 370/229; 370/236; 370/334; 370/394; 370/474

(58) Field of Classification Search .......... 370/328–330, 370/335–337, 342–345, 347, 431, 436, 441, 370/442, 465, 468, 469, 522, 229–236, 334, 370/394, 474
See application file for complete search history.

(56) References Cited

U.S. PATENT DOCUMENTS 6,021,124 A * 2/2000 Haartsen ........................ 370/336
6,421,803 B1   7/2002 Persson et al.
(Continued)

FOREIGN PATENT DOCUMENTS

EP        1 389 848      2/2004
WO        03/036844      5/2003
(Continued)

OTHER PUBLICATIONS

Aniba et al., "Adaptive Proportional Fairness for Packet Scheduling in HSDPA", Global Telecommunications Conference, 2004, GLOBECOM, vol. 6, pp. 4033-4037, (Nov. 29-Dec. 3, 2004).
(Continued)

*Primary Examiner* — Ajit Patel
(74) *Attorney, Agent, or Firm* — Volpe And Koenig, P.C.

(57) ABSTRACT

A method and apparatus for selecting multiple transport formats and transmitting multiple transport blocks (TBs) in a transmission time interval simultaneously with multiple hybrid automatic repeat request (H-ARQ) processes in a wireless communication system are disclosed. Available physical resources and H-ARQ processes associated with the available physical resources are identified and channel quality of each of the available physical resources is determined. Quality of service (QoS) requirements of higher layer data to be transmitted are determined. The higher layer data is mapped to at least two H-ARQ processes. Physical transmission and H-ARQ configurations to support QoS requirements of the higher layer data mapped to each H-ARQ process are determined. TBs are generated from the mapped higher layer data in accordance with the physical transmission and H-ARQ configurations of each H-ARQ process, respectively. The TBs are transmitted via the H-ARQ processes simultaneously.

72 Claims, 2 Drawing Sheets

U.S. PATENT DOCUMENTS

| | | | |
|---|---|---|---|
| 7,447,968 B2 | 11/2008 | Ha et al. | |
| 2003/0086391 A1* | 5/2003 | Terry et al. | 370/329 |
| 2003/0152062 A1* | 8/2003 | Terry et al. | 370/349 |
| 2003/0153276 A1* | 8/2003 | Terry et al. | 455/69 |
| 2004/0190523 A1* | 9/2004 | Gessner et al. | 370/395.4 |
| 2004/0199846 A1 | 10/2004 | Matsumoto et al. | |
| 2005/0276266 A1 | 12/2005 | Terry | |
| 2006/0092972 A1* | 5/2006 | Petrovic et al. | 370/469 |
| 2007/0255993 A1* | 11/2007 | Yap et al. | 714/748 |

FOREIGN PATENT DOCUMENTS

| | | |
|---|---|---|
| WO | 03/069818 | 8/2003 |
| WO | 03/094554 | 11/2003 |
| WO | 2005/112327 | 11/2005 |
| WO | 2005/112331 | 11/2005 |

OTHER PUBLICATIONS

Das et al., "Evolution of UTMS Toward High-Speed Downlink Packet Access", Bell Labs Technical Journal, vol. 7, No. 7, pp. 47-68, (Mar. 4, 2003).

Ericsson et al., *Text Proposal on Adaptive Modulation and Channel Coding Rate Control For Frequency Domain Scheduling in Evolved UTRA Downlink*, TSG-RAN WG1 #43, R1-051307, (Seoul, Korea Nov. 7-11, 2005).

Iacono et al., *Transport Format Usage System Level Design White Paper*, RP79523, InterDigital Communications Corporation, (2001).

Lundevall et al., "Streaming Applications Over HSDPA In Mixed Service Scenarios", 2004 IEEE $60^{th}$ Vehicular Technology Conference, 2004. VTC2004-Fall., vol. 2, pp. 841-845, (Sep. 26-29, 2004).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V0.3.1 (Nov. 2006).

Third Generation Partnership Project, "Technical Specification Group Radio Access Network; Physical Channels and Modulation (Release 8)," 3GPP TS 36.211 V0.2.1 (Nov. 2006).

Third Generation Partnership Project, "Technical Specification Group Radio Access Network; Multiplexing and channel coding (Release 8)," 3GPP TS 36.212 V0.2. 1 (Nov. 2006).

Third Generation Partnership Project, "Technical Specification Group Radio Access Network; Physical layer procedures (Release 8)," 3GPP TS 36.213 V0.1.0 (Oct. 2006).

Zheng et al., Multiple ARQ Processes for MIMO Systems, EURASIP Journal of Applied Signal Processing, Hindawi Publishing Corporation, vol. 5, Section 3, pp. 772-782, (May 2004).

* cited by examiner

METHOD AND APPARATUS FOR SELECTING MULTIPLE TRANSPORT FORMATS AND TRANSMITTING MULTIPLE TRANSPORT BLOCKS SIMULTANEOUSLY WITH MULTIPLE H-ARQ PROCESSES

CROSS REFERENCE TO RELATED APPLICATIONS

This application claims the benefit of U.S. provisional application Nos. 60/754,714 filed Dec. 29, 2005 and 60/839,845 filed Aug. 24, 2006, which are incorporated by reference as if fully set forth.

FIELD OF INVENTION

The present invention is related to wireless communication systems. More particularly, the present invention is related to a method and apparatus for selecting multiple transport formats and transmitting multiple transport blocks (TBs) in a transmission time interval (TTI) simultaneously with multiple hybrid automatic repeat request (H-ARQ) processes in a wireless communication system.

BACKGROUND

The objective of evolved high speed packet access (HSPA+) and long term evolution (LTE) of universal terrestrial radio access (UTRA) and universal terrestrial radio access network (UTRAN) is to develop a radio access network for high data rate, low latency, packet optimization, and improved system capacity and coverage. In order to achieve these goals, an evolution of a radio interface and radio network architecture are being considered. In HSPA+, the air interface technology will still be based on code division multiple access (CDMA) but with more efficient physical layer architecture which may include independent channelization codes, (distinguished with regard to channel quality), and multiple-input multiple-output (MIMO). In LTE, orthogonal frequency division multiple access (OFDMA) and frequency division multiple access (FDMA) are proposed as the air interface technologies to be used in the downlink and the uplink, respectively.

H-ARQ has been adopted by several wireless communication standards, including third generation partnership project (3GPP) and 3GPP2. Besides radio link control (RLC) layer automatic repeat request (ARQ) function, H-ARQ improves throughput, compensates for link adaptation errors and provides efficient transmission rates through the channel. The delay caused by H-ARQ feedback, (i.e., a positive acknowledgement (ACK) or a negative acknowledgement (NACK)), is significantly reduced by placing the H-ARQ functionality in a Node-B rather than in a radio network controller (RNC). A user equipment (UE) receiver may combine soft bits of the original transmission with soft bits of subsequent retransmissions to achieve higher block error rate (BLER) performance. Chase combining or incremental redundancy may be implemented.

Asynchronous H-ARQ is used in high speed downlink packet access (HSDPA) and synchronous H-ARQ is used in high speed uplink packet access (HSUPA). In both HSDPA and HSUPA, radio resources allocated for the transmission are the number of codes at a certain frequency band based on one channel quality indication (CQI) feedback. There is no differentiation among channelization codes. Therefore, one HSDPA medium access control (MAC-hs) flow or one HSUPA medium access control (MAC-e/es) flow multiplexed from multiple dedicated channel MAC (MAC-d) flows is assigned to one H-ARQ process and one cyclic redundancy check (CRC) is attached to one transport block.

A new physical layer attribute introduced in HSPA+ includes MIMO and different channelization codes. New physical layer attributes introduced in LTE include MIMO and different subcarriers, (localized or distributed). With introduction of these new physical layer attributes, the performance of conventional single H-ARQ scheme and transport format combination (TFC) selection procedure should be changed. In a conventional single H-ARQ scheme, only one H-ARQ process is active at a time and a TFC of only one transport data block needs to be determined in each TTI. The conventional TFC selection procedure does not have the ability to make TFC selection for more than one data block for multiple H-ARQ processes.

SUMMARY

The present invention is related to a method and apparatus for selecting multiple transport formats and transmitting multiple TBs in a TTI simultaneously with multiple H-ARQ processes in a wireless communication system. Available physical resources and the channel quality of each of the available physical resources are determined, and the H-ARQ processes associated with the available physical resources are identified. Quality of service (QoS) requirements of higher layer data flow(s) to be transmitted are determined. The higher layer data flow(s) is mapped to at least two H-ARQ processes. Physical transmission parameters and H-ARQ configurations to support QoS requirements of the higher layer data flow(s) mapped to each H-ARQ process are determined. TBs are generated from the mapped higher layer data flow(s) in accordance with the physical transmission parameters and H-ARQ configurations of each H-ARQ process, respectively. The TBs are transmitted via the H-ARQ processes simultaneously.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit" (WTRU) includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, an evolved Node-B (eNB), a site controller, an access point (AP), or any other type of interfacing device capable of operating in a wireless environment.

The present invention is applicable to any wireless communication system including, but not limited to, wideband code division multiple access (WCDMA), CDMA2000, HSPA+, LTE of 3GPP systems, OFDM, MIMO or OFDM/MIMO.

The features of the present invention may be incorporated into an integrated circuit (IC) or be configured in a circuit comprising a multitude of interconnecting components.

Different antenna spatial beams or channelization codes may experience a different channel quality, which may be indicated by CQI feedback. The same adaptive modulation and coding (AMC) may be applied to all the subcarriers, spatial beams or channelization codes which are independent of the quality of the subcarriers, spatial beams and channelization codes. Alternatively, the channel condition may be used to apply different AMC to different subcarriers, spatial beams or channelization codes in order to maximize the performance.

When subcarrier, spatial beam or channelization code-dependent AMC is used, each data block that is assigned to each subcarrier, spatial beam or channelization code is associated with one CRC in accordance with the present invention. Otherwise, upon transmission error, the entire packet distributed to different subcarriers, spatial beams or channelization codes need to be retransmitted because the whole packet is associated with a single CRC. Retransmitting every data block that has already been correctly received will waste the valuable radio resources. The same situation applies when MIMO is used because each antenna may be subject to different channel conditions. Thus, when multi-dimensional H-ARQ processes are used with each H-ARQ process corresponding to one or more subcarriers, channelization codes, transmit antennas (or spatial beams), a separate CRC is attached to each transport data block in accordance with the present invention. In a conventional single H-ARQ scheme, only one H-ARQ process is active at a time and a TFC of only one transport data block needs to be determined in each TTI. The conventional TFC selection procedure does not have the ability to make TFC selection for more than one data block for multiple H-ARQ processes to properly support QoS requirements of higher layer data flows.

Figure 1:
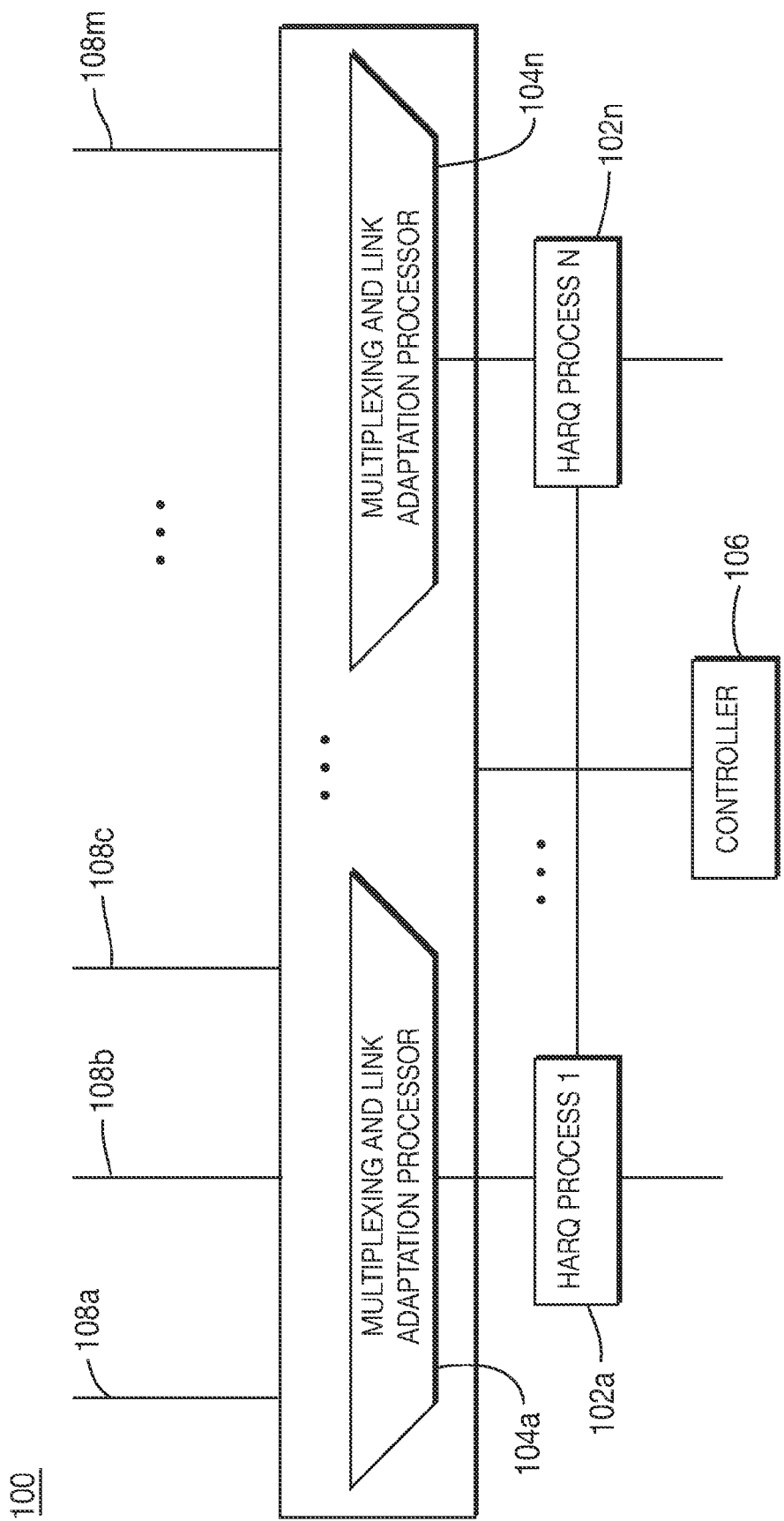
FIG. 1 is a block diagram of an apparatus configured in accordance with the present invention.

FIG. 1 is a block diagram of an apparatus 100 for transmitting multiple transport blocks (TBs) simultaneously in a transmission time interval (TTI) with multiple H-ARQ processes in accordance with the present invention. The apparatus 100 may be a WTRU, a Node-B, or any other communication device. The apparatus 100 includes a plurality of H-ARQ processes 102a-102n, a plurality of multiplexing and link adaptation processors 104a-104n and a controller 106. Each multiplexing and link adaptation processor 104a-104n is associated with one H-ARQ process 102a-102n. Each multiplexing and link adaptation processor 104a-104n receives physical resource configuration, (i.e., sub-carriers distributed or localized, MIMO antenna configurations, or the like), and CQIs associated with these physical resources.

Each available H-ARQ process 102a-102n is associated with a specific set of physical resources. The association of physical resources to the H-ARQ processes 102a-102n may be determined dynamically, or the association may be semi-statically configured. A network entity, (e.g., an eNB scheduler), determines how many physical resources should be assigned. Physical resources associated with a particular H-ARQ process may be dynamically reassigned each time a TFC is selected by the multiplexing and link adaptation processor 104a-104n or each time the H-ARQ processor 102a-102n generates an H-ARQ retransmission for a particular TB. The reassignment of physical resources may be performed based on the CQI of particular physical resources or determined based on a predefined hopping pattern.

The multiplexing and link adaptation processors 104a-104n perform link adaptation independently for each set of physical resources and associated H-ARQ processes 102a-102n. Each multiplexing and link adaptation processor 104a-104n determines a modulation and coding scheme (MCS), a multiplexed TB, transmit power requirement, an H-ARQ redundancy version and maximum number of retransmissions each TTI. This set of transmission information is provided to each H-ARQ process 102a-102n.

The physical resources may be defined by independent spatial streams (if MIMO is implemented) in the space domain, independent subcarriers (if OFDMA or FDMA is implemented) in the frequency domain, independent channelization codes (if CDMA is implemented) in the code domain, independent timeslots in the time domain, or any combination thereof. The independent subcarriers may be distributed or localized. The channelization codes are physical resources that can be assigned to different TBs independently. In CDMA systems, different channelization codes may be assigned to transmit one TB, or several TBs based on the channel condition and data rate requirement for each TB. The maximum number of TBs that can be transmitted is less than or equal to the maximum number of channelization codes available. When several independent spatial streams, subcarriers or channelization codes are available, several TBs may be transmitted simultaneously via different physical resources with several H-ARQ processes. For example, if two spatial streams are available in a 2×2 MIMO system, two TBs may be transmitted simultaneously via two spatial streams with two independent H-ARQ processes.

Different physical resources, (i.e., different subcarriers, antenna spatial beams, channelization codes or timeslots), may experience different channel quality. The quality of each physical resource is determined by one or more CQI measurements. The CQI may be fed back from a communication peer or may be obtained based on channel reciprocity. The CQI may also be represented by an allowed MCS and/or maximum transport block size.

The controller 106 identifies available physical resources and H-ARQ processes associated with the available physical resources. Since each H-ARQ process 102a-102n is associated with a particular physical resource, when available physical resources are identified, available H-ARQ processes are also identified. The available physical resources and associated H-ARQ processes may be determined at the start of a common TTI boundary. The association may also be semi-statically configured over a period of multiple TTIs.

The available physical resources are the number of independent spatial streams, subcarriers, channelization codes and timeslots that can be used for data transmission within a certain period. The available physical resources for one WTRU are dependent on many factors such as number of WTRUs that a Node-B needs to support in one cell, the interference level from other cells, the channel condition of the WTRU, the QoS levels (such as priorities, latency, fairness and buffer status) of the services the WTRU needs to support, the data rates one WTRU needs to support, or the like.

In accordance with the present invention, multiple H-ARQ processes 102a-102n operate simultaneously and in parallel. Since H-ARQ processes 102a-102n may take a different number of retransmissions for successful transmission and since the data flows mapped to the H-ARQ processes 102a-102n may have QoS requirements that determine a different maximum number of retransmissions or different TTI sizes, a certain H-ARQ may not be available if H-ARQ processes are not synchronized with each other. Any number of H-ARQ processes may become available in any TTI. In accordance with the present invention, more than one H-ARQ process and associated set of physical resources become available in a common TTI. The association between H-ARQ processes and physical resources is coordinated by the controller 106.

The controller 106 maps higher layer data flows 108a-108m, (i.e., multiple flows of MAC or RLC protocol data units (PDUs)), to at least two multiplexing and link adaptation processors 104a-104n and their associated H-ARQ processes 102a-102n. The same higher layer data flow 108a-108m may be mapped to more than one multiplexing and link adaptation processor 104a-104n and H-ARQ process 102a-102n in a common TTI for QoS normalization. By mapping the same higher layer data flow or set of higher layer data flows to multiple H-ARQ processes, QoS requirement across the H-ARQ process 102a-102n is common. In this case, each multiplexing and link adaptation processor 104a-104n determines an MCS, a transport block size, a transmit power, maximum H-ARQ transmissions and transmission parameters in accordance with the CQIs of the set of associated physical resources so that the QoS achieved for each transmission of the higher layer data flow or set of data flows is as similar as possible.

Alternatively, unequal error protection may also be achieved by mapping the higher layer data flows 108a-108m, that may be grouped in accordance with QoS requirements to different H-ARQ processes 102a-102n based on the data flow QoS requirements and CQIs associated with the set of physical resources assigned to each H-ARQ process. For example, CQIs may show that one set of physical resources is better than other sets of physical resources. A higher layer data flow with higher QoS requirements may be mapped to an H-ARQ process associated with better physical resources. The number of higher layer data flows that will be mapped to a specific H-ARQ process is determined based on the QoS requirements of the higher layer data flows, packet size, H-ARQ capacity, or the like. Once the respective higher layer data flows to be transmitted using specific H-ARQ processes are decided, those data flows are multiplexed through the multiplexing and link adaptation processors 104a-104n for different H-ARQ processes.

Each multiplexing and link adaptation processor 104a-104n receives an input, (such as, CQIs of the assigned physical resources, buffer occupancy of the mapped data flows, or the like), and determines physical transmission parameters and H-ARQ configurations to support QoS requirements of the higher layer data flows 108a-108m mapped to each H-ARQ process. The physical transmission parameters include a transmission power, a modulation and coding scheme, a TTI size, a transport block size and a beamforming pattern, the subcarrier allocation, MIMO antenna configuration or the like. The H-ARQ configuration parameters include an H-ARQ identity, a maximum number of retransmissions, a redundancy version (RV), a CRC size, or the like. The multiplexing and link adaptation processor 104a-104n provides the H-ARQ parameters to the associated H-ARQ process 102a-102n.

The multiplexing and link adaptation processor 104a-104n may apply the same MCS, transport block size, TTI size and/or transmit power to all physical resources which are independent of the quality of the physical resources. Alternatively, the multiplexing and link adaptation processor 104a-104n may apply different MCS, transport block size, TTI size and/or transmit power to different physical resources based on channel condition in order to maximize the performance.

When physical resource-dependent AMC and H-ARQ operation is used, each data block that is assigned to each physical resource is preferably associated with a separate CRC. With this scheme, the entire packet distributed to different physical resources does not need to be retransmitted upon a transmission error because each transport block is associated with a separate CRC and is processed by a separate H-ARQ process 102a-102n.

The multiplexing and link adaptation processors 104a-104n then generate TBs from the assigned higher layer data flows 112a-112m after selecting a proper TFC, (i.e., TB size, TB set size, TTI size, modulation and coding scheme (MCS), transmission power, antenna beams, the subcarrier allocation, CRC size, redundancy version (RV) and data block to radio resource mapping, or the like), for the TB based on channel quality indicators and the physical transmission parameters. One or more higher layer data flows may be multiplexed into one TB. A separate CRC is attached to each of the TBs for separate error detection and H-ARQ processing. Each TB and associated transmission parameters are provided to the assigned H-ARQ process 102a-102n. The TBs are then transmitted via the assigned H-ARQ processes 102a-102n, respectively.

The parameters supporting multiple H-ARQ processes may be signaled to a receiving peer before transmission or a blind detection technique may be used at the receiving peer to decode the transmission parameters. The generated TBs along with the associated transmission parameters are sent to the H-ARQ processes 102a-102n for transmission.

Figure 2:
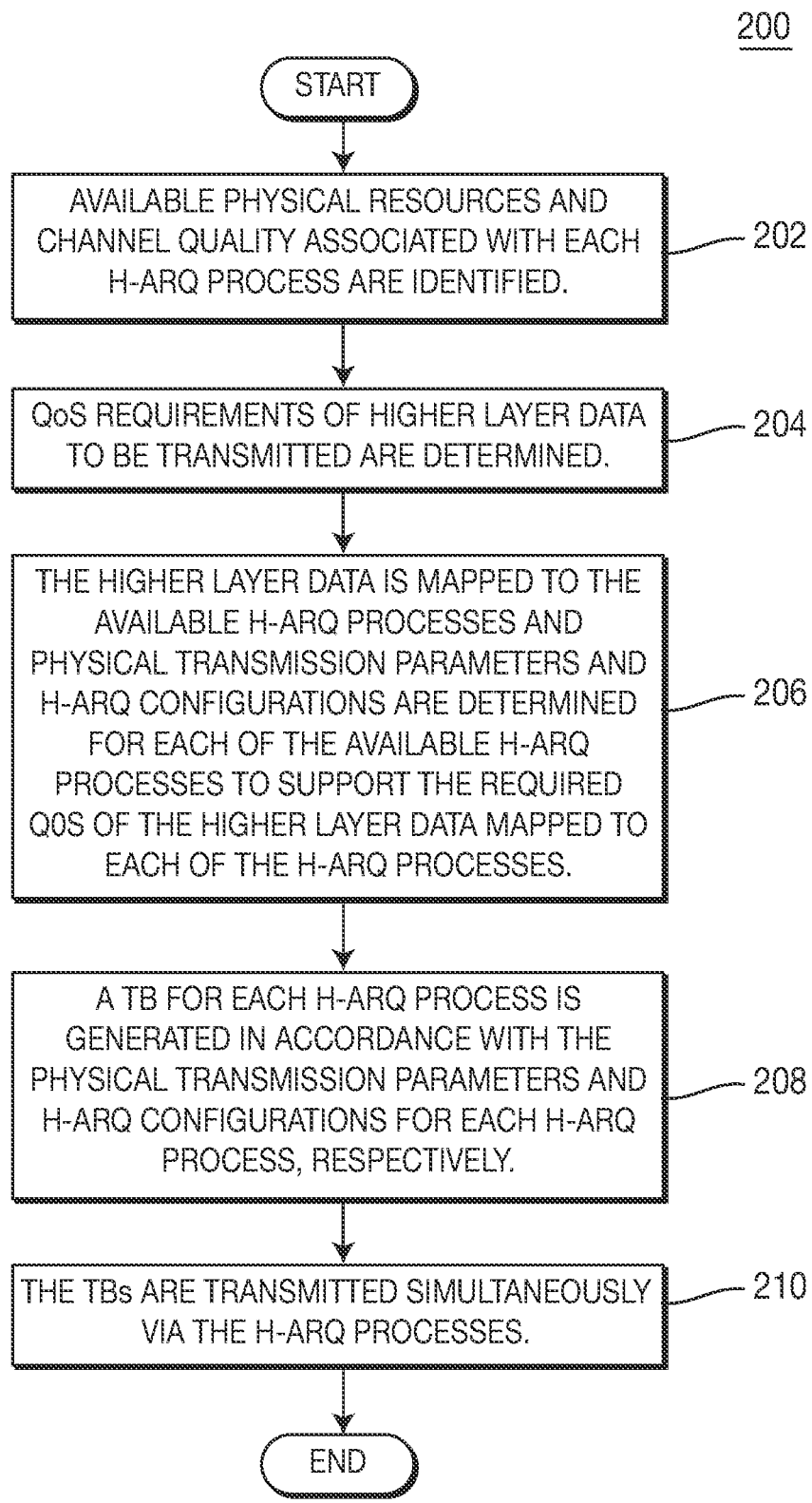
FIG. 2 is a flow diagram of a process for transmitting multiple TBs in a TTI simultaneously with multiple H-ARQ processes in accordance with the present invention.

FIG. 2 is a flow diagram of a process 200 for transmitting multiple TBs in a TTI simultaneously with multiple H-ARQ processes in accordance with the present invention. Available physical resources and their channel quality associated with each H-ARQ process 102a-102n are identified (step 202). QoS requirements and buffer occupancy of higher layer data flow 112a-112m to be transmitted are determined (step 204). It should be noted that the steps in the process 200 may be performed in different order and some steps may be performed in parallel. For example, the step 204 may be applied before the step 202, or simultaneously.

The controller 106 may determine the type of higher layer data flows 112a-112m for TFC selection processing based on QoS parameters associated with those higher layer data flows. The controller 106 may also determine the order in which the higher layer data flows are serviced. The order of processing may be determined by QoS requirements or absolute priority. Alternatively, a life span time parameter may be used in determining the duration that the higher layer data packets may stay in an H-ARQ queue so that the controller 106 may prioritize or discard higher layer data packets based on the life span time parameter.

The higher layer data flows 112a-112 are mapped to the respective H-ARQ processes 102a-102n by the controller 106. Physical transmission parameters and H-ARQ configurations are determined for each of the available H-ARQ processes 102a-102n to support the required QoS of the higher layer data flows 112a-112m mapped to each of the H-ARQ processes 102a-102n (step 206). When more than one H-ARQ process is available for transmission in a TTI, it is necessary to determine which higher layer data flows 112a-112m should be mapped to different H-ARQ processes. The higher layer data flows 112a-112m may or may not have similar QoS requirements.

When all or a subset of higher layer data flows 112a-112m to be mapped to different HARQ processes require similar QoS, then the QoS provided by the H-ARQ processes 102a-102n is normalized, (i.e., transmission parameters, (such as, MCS, TB size and transmission power), and H-ARQ configurations are adjusted each TTI a TFC is selected such that the QoS provided across the H-ARQ processes 102a-102n is similar). The QoS normalization across multiple H-ARQ processes 102a-102n may be realized by adjusting the link adaptation parameters (e.g., MCS, TB size, transmission power, or the like) across the H-ARQ processes 102a-102n. For example, a higher MCS may be assigned to the physical resources that have better channel quality and a lower MCS may be assigned to the physical resources that have worse channel quality. This may result in different sizes of the multiplexed data block for different H-ARQ processes.

Alternatively, when the higher layer data flows 112a-112m require different QoSs, the higher layer data flows 112a-112m may be mapped to H-ARQ processes 102a-102n associated with physical resources with quality that closely matches the QoS requirements of the higher layer data flows 112a-112m. An advantage of using multiple H-ARQ processes is its flexibility to multiplex logical channels or MAC flows with different QoS requirements to different H-ARQ processes 102a-102n and associated physical resources. When a certain physical resource indicates a better channel quality than others, data with a higher QoS is mapped to the H-ARQ process associated with that physical resource. This enhances physical resource utilization and maximizes system throughput. Alternatively, or additionally, an MCS and/or the maximum number of retransmissions may be configured to differentiate the QoS to more closely match the logical channel or MAC flow's QoS requirements.

After the higher layer data flows 112a-112m are mapped to the H-ARQ processes 102a-102n, a TB for each H-ARQ process 102a-102n is generated in accordance with the physical transmission parameters and H-ARQ configurations for each H-ARQ process 102a-102n, respectively, by multiplexing the higher layer data flows 112a-112m associated with each H-ARQ process 102a-102n (step 208). Data multiplexing for each H-ARQ process 102a-102n may be processed sequentially or in parallel. The TBs are then transmitted simultaneously via the associated H-ARQ processes 102a-102n (step 210).

The transmitted TBs may or may not be successfully received at the communication peer. A failed TB is retransmitted in a subsequent TTI. Preferably, the size of the retransmitted TB remains the same for soft combing at the communication peer. Several options are possible for retransmission of the failed TB.

In accordance with the first option, the physical resources allocated for H-ARQ retransmission of the TB remain unchanged, (i.e., the failed TB is retransmitted via the same physical resources and H-ARQ process. The transmission parameters and H-ARQ configurations, (i.e., a TFC), may be changed. Specifically, the link adaptation parameters, (such as antenna selection, AMC or transmit power), may be changed to maximize the chance of successful delivery of the retransmitted TB. When the link adaptation parameters are changed for retransmission of the failed TB, the changed parameters may be signaled to the receiving peer. Alternatively, a blind detection technique may be applied at the receiving peer to eliminate the signaling overhead for changed parameters.

In accordance with the second option, physical resources allocated for H-ARQ retransmission of the transport block may be dynamically reassigned, (i.e., the failed TB is retransmitted on different physical resources and the same H-ARQ process). The reassignment of physical resources may be based on CQI or based on a known hopping pattern.

In another option, a failed H-ARQ transmission may be fragmented across multiple H-ARQ processes and each fragment transmitted independently to increase the probability of successful H-ARQ transmission. In accordance with this option, the physical resources for the retransmitted TB are newly allocated, (i.e., the failed TB is transmitted via a different H-ARQ process). The H-ARQ process used to transmit the failed TB in the previous TTI becomes available for transmission of any other TB in the subsequent TTI. The maximum transmit power, the number of subcarriers or channelization codes, the number or allocation of antennas and recommended MCS may be re-allocated for retransmission of the failed TB. Preferably, a new allowed TFCS subset may be generated to reflect the physical resource change for the failed TB. The new parameters may be signaled to the receiving peer to guarantee successful reception. Alternatively, a blind detection technique may be applied at the receiving peer to eliminate the signaling overhead for changed parameters.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for transmitting multiple transport blocks (TBs) in a transmission time interval (TTI) the method comprising:
   identifying at least two sets of available physical resources, each set of physical resources having different frequency subcarriers and each set of physical resources being associated with a different hybrid automatic repeat request (H-ARQ) process;
   obtaining a channel quality measurement of each set of physical resources;
   mapping at least one higher layer data flow to at least two H-ARQ processes;

determining physical transmission parameters and H-ARQ configurations for each set of available physical resources and associated H-ARQ process to support QoS requirements of the higher layer data flow multiplexed into a transport block and provided to each H-ARQ process, wherein the physical transmission parameters include a modulation and coding scheme (MCS);

multiplexing the at least one higher layer data flow into transport blocks (TBs) in accordance with the physical transmission parameters and H-ARQ configurations of each set of available physical resources and associated H-ARQ process and processing each TB in response to the determined physical transmission parameters and over subcarriers of the set of physical resources associated with the HARQ process of that transport block; and transmitting the TBs via the at least two H-ARQ processes in the TTI.

2. The method of claim 1 wherein the physical transmission parameters and H-ARQ configurations include a transport format combination (TFC) for each TB.

3. The method of claim 1 wherein communication nodes include multiple antennas for multiple-input multiple-output (MIMO) and the available physical resources are identified based on independent spatial data streams.

4. The method of claim 1 further comprising transmitting the TBs via the at least two H-ARQ processes simultaneously in the TTI.

5. The method of claim 4 wherein the subcarriers are distributed subcarriers.

6. The method of claim 4 wherein the subcarriers are localized subcarriers.

7. The method of claim 1 wherein the available physical resources are identified based on independent channelization codes.

8. The method of claim 1 wherein the available physical resources are identified based on different time slots.

9. The method of claim 1 wherein the association of the physical resources and the H-ARQ processes is dynamically determined.

10. The method of claim 1 wherein the association of the physical resources and the H-ARQ processes is semi-statically configured.

11. The method of claim 1 further comprising:
selecting higher layer data flows to be transmitted in a next TTI, whereby only the selected higher layer data flows are mapped to the H-ARQ processes.

12. The method of claim 11 wherein a packet on each higher layer data flow is assigned a life span time, whereby the selection of a packet for transmission is made based on the life span time.

13. The method of claim 1 wherein on a condition that the QoS requirements of the higher layer data flows are similar, the physical transmission and H-ARQ configurations are determined such that QoS across the available H-ARQ processes is similar.

14. The method of claim 13 wherein a higher order modulation and coding scheme (MCS) is applied to an H-ARQ process with a higher channel quality and a lower order MCS is applied to an H-ARQ process with a lower channel quality.

15. The method of claim 13 wherein a number of maximum retransmissions is assigned to each H-ARQ process based on the QoS requirement of a higher layer data flow mapped to the H-ARQ process.

16. The method of claim 1 wherein on a condition that the QoS requirements of the higher layer data flows are not similar, each of the higher layer data flows is mapped to an H-ARQ process associated with channel quality that closely matches to a QoS requirement of the higher layer data flow.

17. The method of claim 1 wherein on a condition that the QoS requirements of the higher layer data flows are not similar, a maximum number of retransmissions is assigned to an H-ARQ process based on the QoS requirement of a higher layer data flow mapped to the H-ARQ process.

18. The method of claim 1 wherein physical resources mapped to the H-ARQ process are unchanged for retransmission of a TB when transmission of the TB fails.

19. The method of claim 18 wherein physical transmission and H-ARQ configurations are changed for retransmission of the TB.

20. The method of claim 18 wherein the TB is fragmented for retransmission.

21. The method of claim 1 wherein physical resources mapped to the TB are changed for retransmission of the TB when transmission of the TB fails.

22. The method of claim 1 wherein the wireless communication system is an evolved high speed packet access (HSPA+) system.

23. The method of claim 1 wherein the wireless communication system is a long term evolution (LTE) of a third generation (3G) wireless communication system.

24. The method of claim 1 wherein the available physical resources and associated H-ARQ processes are determined at the start of common TTI boundary.

25. The method of claim 1 wherein the physical transmission parameters include a modulation and coding scheme (MCS) for each TB.

26. The method of claim 25 wherein an MCS for each TB is selected to differentiate QoS requirements of the TBs.

27. The method of claim 25 wherein an MCS for each TB is selected such that the QoS supported across the H-ARQ processes is similar.

28. The method of claim 1 wherein the physical transmission parameters include a transport block size for each TB.

29. The method of claim 28 wherein a TB size for each TB is selected to differentiate QoS requirements of the TBs.

30. The method of claim 28 where a TB size for each TB is selected such that the QoS supported across the H-ARQ processes is similar.

31. An apparatus for transmitting multiple transport blocks (TBs) in a transmission time interval (TTI), the apparatus comprising:
a plurality of H-ARQ processes;
a controller configured to identify at least two sets of available physical resources, each set of physical resources having different frequency subcarriers and each set of physical resources being associated with a different hybrid automatic repeat request (H-ARQ) process, and map at least one higher layer data flow to at least two H-ARQ processes based on channel quality of each of the available sets of physical resources and quality of service (QoS) requirements of the higher layer data flows;
at least two multiplexing and link adaptation processors, each multiplexing and link adaptation processor being associated with one of the at least two H-ARQ process and configured to determine physical transmission parameters and H-ARQ configurations for the associate H-ARQ process to support QoS requirements of the higher layer data flows multiplexed into a transport block and provided to the associated H-ARQ process, wherein the physical transmission parameters include a modulation and coding scheme (MCS);

each multiplexing and link adaptation processor configured to multiplex the at least one higher layer data flow into a TB in accordance with the physical transmission parameters and H-ARQ configurations of the associated H-ARQ process and process each TB in response to the determined physical transmission parameters and over subcarriers of the set of physical resources associated with the HARQ process of that transport block; and a transmitter configured to transmit the TBs associated with the at least two H-ARQ processes in the TTI.

32. The apparatus of claim 31 wherein each multiplexing and link adaptation process determines a transport format combination (TFC) for the higher layer data flow mapped.

33. The apparatus of claim 31 wherein the controller identifies the available physical resources based on independent spatial data streams generated by multiple antennas for multiple-input multiple-output (MIMO).

34. The apparatus of claim 31 wherein the controller identifies the available physical resources based on independent subcarriers.

35. The apparatus of claim 34 wherein the subcarriers are distributed subcarriers.

36. The apparatus of claim 34 wherein the transmitter is configured to transmit the TBs associated with the at least two H-ARQ processes simultaneously in the TTI.

37. The apparatus of claim 31 wherein the controller identifies the available physical resources based on independent channelization codes.

38. The apparatus of claim 31 wherein the available physical resources are identified based on different time slots.

39. The apparatus of claim 31 wherein the association of the physical resources and the H-ARQ processes is dynamically determined.

40. The apparatus of claim 31 wherein the association of the physical resources and the H-ARQ processes is statically configured.

41. The apparatus of claim 31 wherein the controller is configured to select at least one higher layer data flow to be transmitted in a next TTI and map only the selected higher layer data flow to the H-ARQ processes.

42. The apparatus of claim 41 wherein a packet on the higher layer data flow is assigned a life span time, whereby the controller selects a packet for transmission based on the life span time.

43. The apparatus of claim 31 wherein on a condition that the QoS requirements of the higher layer data flows are similar, the controller determines the physical transmission and H-ARQ configurations to normalize QoS across the available H-ARQ processes.

44. The apparatus of claim 43 wherein the controller applies a higher order modulation and coding scheme (MCS) to an H-ARQ process with a higher channel quality and applies a lower order MCS to an H-ARQ process with a lower channel quality.

45. The apparatus of claim 43 wherein the controller assigns a maximum retransmission limit to each H-ARQ process based on the QoS requirement of the higher layer data mapped to the H-ARQ process.

46. The apparatus of claim 31 wherein on a condition that the QoS requirements of the higher layer data are not similar, the controller maps the higher layer data flows to an H-ARQ process associated with a channel quality that closely matches to a QoS requirement of the higher layer data.

47. The apparatus of claim 31 wherein on a condition that the QoS requirements of the higher layer data are not similar, the controller assigns a maximum retransmission limit to an H-ARQ process based on the QoS requirement of the higher layer data mapped to the H-ARQ process.

48. The apparatus of claim 31 wherein the controller assigns the same physical resources for retransmission of a TB when transmission of the TB fails.

49. The apparatus of claim 48 wherein the controller changes physical transmission and H-ARQ configurations for retransmission of the TB.

50. The apparatus of claim 48 wherein the controller fragments the TB for retransmission.

51. The apparatus of claim 31 wherein the controller changes physical resources for retransmission of a TB when transmission of the TB fails.

52. The apparatus of claim 31 wherein the wireless communication system is an evolved high speed packet access (HSPA+) system.

53. The apparatus of claim 31 wherein the wireless communication system is a long term evolution (LTE) of a third generation (3G) wireless communication system.

54. The apparatus of claim 31 wherein the available physical resources and associated H-ARQ processes are determined at the start of common TTI boundary.

55. The apparatus of claim 31 wherein the physical transmission parameters include a modulation and coding scheme (MCS) for each TB.

56. The apparatus of claim 55 wherein an MCS for each TB is selected to differentiate QoS requirements of the TBs.

57. The apparatus of claim 55 wherein an MCS for each TB is selected such that the QoS supported across the H-ARQ processes is similar.

58. The apparatus of claim 31 wherein the physical transmission parameters include a transport block size for each TB.

59. The apparatus of claim 58 wherein a TB size for each TB is selected to differentiate QoS requirements of the TBs.

60. The apparatus of claim 58 where a TB size for each TB is selected such that the QoS supported across the H-ARQ processes is similar.

61. A wireless transmit/receive unit (WTRU) comprising:
a circuit configured to produce a plurality of data flows;
wherein the circuit is further configured to multiplex the plurality of data flows into a plurality of transport blocks; wherein at least one of the plurality of data flows is multiplexed into at least two transport blocks;
wherein the circuit is further configure to provide the plurality of transport blocks to a plurality of HARQ processes for transmission in a single transmission time interval (TTI); wherein at least two of the HARQ processes are associated with different frequency resources; and
wherein the circuit is further configured to transmit each HARQ processed transport block over the frequency resources associated with the respective HARQ; wherein at least two of the HARQ processed transport blocks are transmitted using different MIMO spatial beams in the single TTI.

62. The WTRU of claim 61 wherein a modulation and coding scheme of at least two of the transmitted HARQ processed resource blocks is different.

63. The WTRU of claim 61 wherein the plurality of data flows are multiplexed into the plurality of transport blocks based on QoS requirements of the data flows.

64. The WTRU of claim 61 wherein each of the frequency resources includes a plurality of subcarriers.

65. The WTRU of claim 61 wherein at least two of the HARQ processes are associated with different MIMO spatial beams.

66. The WTRU of claim 61 wherein each of the HARQ processed transport blocks has an associated modulation and coding scheme, redundancy version and a maximum number of retransmissions.

67. A method performed by a wireless transmit/receive unit (WTRU) comprising:
producing a plurality of data flows;
multiplexing the plurality of data flows into a plurality of transport blocks; wherein at least one of the plurality of data flows is multiplexed into at least two transport blocks;
providing the plurality of transport blocks to a plurality of HARQ processes for transmission in a single transmission time interval (TTI); wherein at least two of the HARQ processes are associated with different frequency resources; and
transmitting each HARQ processed transport block over the frequency resources associated with the respective HARQ; wherein at least two of the HARQ processed transport blocks are transmitted using different MIMO spatial beams in the single TTI.

68. The method of claim 67 wherein a modulation and coding scheme of at least two of the transmitted HARQ processed resource blocks is different.

69. The method of claim 67 wherein the plurality of data flows are multiplexed into the plurality of transport blocks based on QoS requirements of the data flows.

70. The method of claim 67 wherein each of the frequency resources includes a plurality of subcarriers.

71. The method of claim 67 wherein at least two of the HARQ processes are associated with different MIMO spatial beams.

72. The method of claim 67 wherein each of the HARQ processed transport blocks has an associated modulation and coding scheme, redundancy version and a maximum number of retransmissions.

* * * * *